(No Model.) 2 Sheets—Sheet 1.

R. BULLYMORE.
Ice House.

No. 229,951. Patented July 13, 1880.

Witnesses: Chas. J. Buchheit, Edw. J. Brady.

Richard Bullymore, Inventor.
By Wilhelm & Bonner, Attorneys.

N. PETERS, PHOTO-LITHOGRAPHER, WASHINGTON, D. C.

(No Model.) 2 Sheets—Sheet 2.
R. BULLYMORE.
Ice House.
No. 229,951. Patented July 13, 1880.
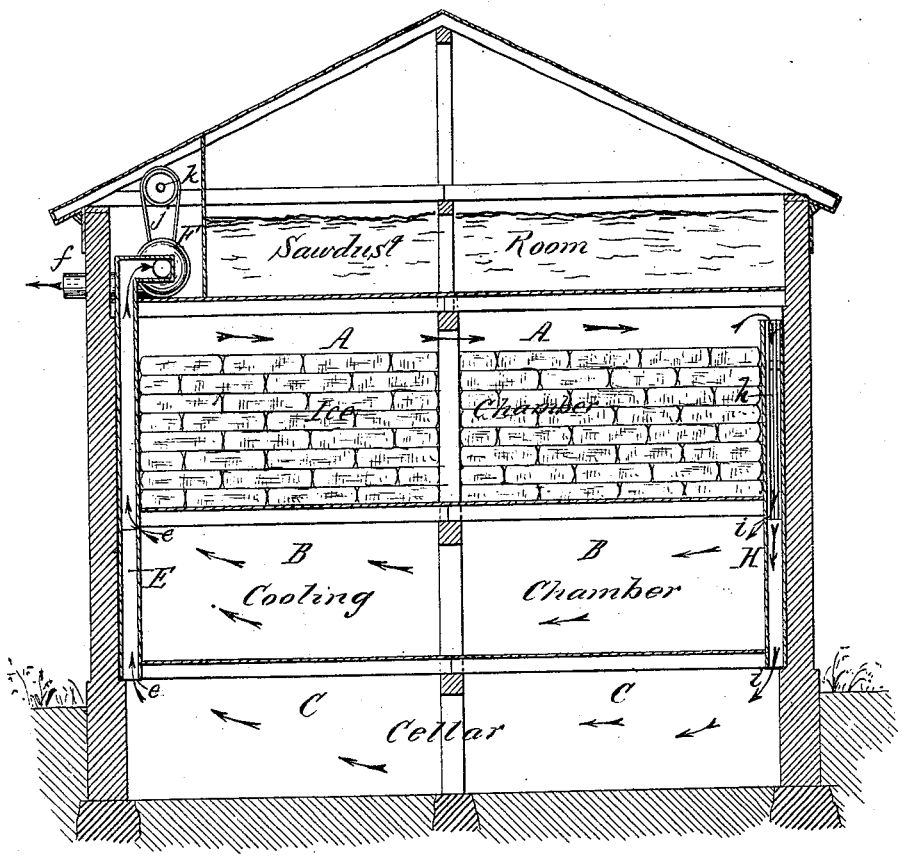
Witnesses: Chas. J. Buchheit, Edw. J. Brady.
Richard Bullymore, Inventor.
By Wilhelm & Bonner, Attorneys.

UNITED STATES PATENT OFFICE.

RICHARD BULLYMORE, OF BUFFALO, NEW YORK.

ICE-HOUSE.

SPECIFICATION forming part of Letters Patent No. 229,951, dated July 13, 1880.

Application filed April 8, 1880. (No model.)

*To all whom it may concern:*

Be it known that I, RICHARD BULLYMORE, of the city of Buffalo, in the county of Erie and State of New York, have invented a new and useful Improvement in Ice-Houses, of which the following is a specification, reference being had to the accompanying drawings.

My invention relates more especially to that class of ice-houses which are used in connection with slaughter-houses, breweries, and other establishments for preserving meat and other perishable substances.

In ice-houses in which fresh meat is stored the hot vapors which arise from the meat condense on the walls and roof of the preserving-chamber and retain or absorb the volatile matters exhaled by the meat and impart to the preserving-chamber a very offensive odor. A similar effect occurs in ice-houses in which the fermentation of beer is tempered, as the heat of fermentation causes vapors to rise from the vats, which vapors are condensed by contact with the cold walls of the cooling-chamber and keep the latter in a moist and offensive condition. The warm vapors exhaled by the substances contained in these preserving-chambers are, furthermore, obnoxious, as they raise the temperature of the chambers and cause a rapid melting of the ice.

The object of my invention is to remedy these difficulties; and it consists in providing an ice-house with one or more ascending flues leading from the preserving chamber or chambers upward to one or more exhaust-fans, whereby the warm and vitiated air is withdrawn from the preserving-chamber without coming in contact with the ice and discharged outside of the ice-house, and one or more descending flues leading from the ice-chamber to the preserving-chamber, whereby the cold air from the ice-chamber is conducted to the preserving chamber or chambers as it is required to take the place of the warm air which is being withdrawn from the preserving-chamber, as will be hereinafter fully set forth.

Figure 1:
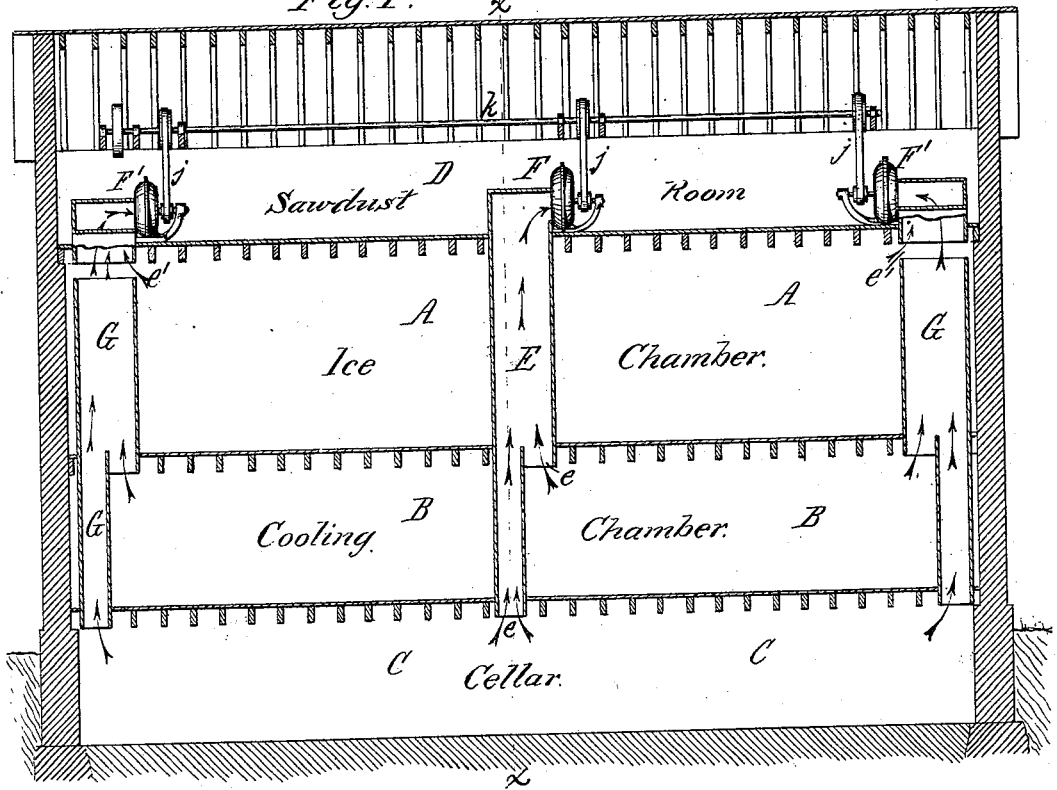
Figure 2:
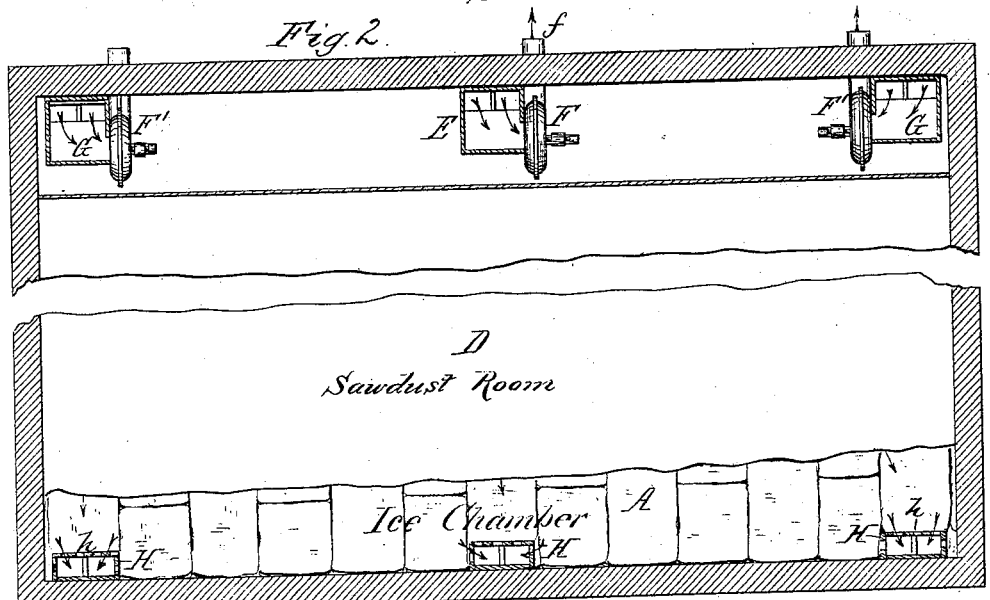

In the accompanying drawings, Figure 1 is a longitudinal vertical section of an ice-house provided with my improvement. Fig. 2 is a horizontal section taken partly through the ice-chamber and partly above the same. Fig. 3 is a cross-section in line $x\ x$, Fig. 1.

Like letters of reference refer to like parts in each of the figures.

A represents the ice-chamber, of any suitable and well-known construction, and B C represent two preserving or cooling chambers, arranged one below the other and below the ice-chamber A, as clearly shown.

D represents the space above the ceiling of the ice-chamber, which space is usually filled with sawdust or some other suitable non-conducting material.

E represents one or more ascending warm-air flues, arranged in the ice-house at or near the middle of one of the side walls thereof, and extending from the lowest preserving-chamber, C, upward and through the ice-chamber. The flue E is provided with an air-inlet opening, $e$, near the ceiling of each preserving-chamber, and preferably made larger in cross-section above each additional air-inlet opening, as shown. The flue E is made tight with the exception of the air-inlets $e$, and connects at its upper end above the ice-chamber with the eye of a suction-fan, F, which withdraws the air from the flue E and discharges the same outside of the building through the discharge-spout $f$.

G G represent two auxiliary ascending flues, arranged near the corners of the ice-house on the same side with the central flue, E. The flues G G are connected at their upper ends with the eyes of suction-fans F', and are constructed like the central flue, E, in all respects, with the exception that the flues G are each provided with an air-inlet opening, $e'$, arranged below the ceiling of the ice-chamber, so as to withdraw from the ice-chamber any warm air or vapor that may accumulate therein.

H represents the descending cold-air flues, arranged on the opposite side of the ice-house and extending from the ice-chamber A to the lowest cooling-chamber, C. That portion of each flue H which rises above the bottom of the ice-chamber is constructed of strips or scantlings, arranged to leave open vertical spaces $h$ between them, through which the cold air can freely enter the flue as the level of the ice sinks in the ice-chamber. The flues H are provided with air-outlet openings $i$, arranged near the ceiling of each cooling-chamber, and the cross-section of each flue is preferably reduced from each air-outlet opening $i$ downward, as shown.

The suction-fans F F' may be driven by belts $j$ from a line-shaft, $k$, as shown, or in any other convenient manner. By the exhausting action of the fans F F' the warm air and vapors are drawn from the cooling-chambers B C through the ascending flues E G directly to the fans and discharged outside of the building without coming in contact with the ice, and the warm air so removed from the cooling-chamber is immediately replaced by cold air, which descends from the ice-chamber A through the flues H. The downward current through the descending flues H to the cooling-chambers B C will be established principally by the closed ascending flue E, which has no opening into the ice-chamber A, while the ascending flues G will draw less strongly from the cooling-chambers to the extent to which they (the flues G) are supplied with warm air or vapor from the ice-chamber.

The fresh meat or other substance which is placed in the cooling-chambers to be preserved has, in ordinary summer weather, frequently a temperature of 80° Fahrenheit and over, and warm vapors charged with offensive odors are exhaled by such meat or other animal or vegetable substances for some time after they are exposed to the cold temperature of the cooling or preserving chamber. These warm vapors and effluvia pass immediately to the ascending flues E G, and are rapidly drawn through the same and discharged outside of the building by the fans F F' without coming in contact with the ice and before they have time to settle or condense in any part of the building. The preserving and ice chambers are thereby kept perfectly dry, cool, and inodorous, and the ice is prevented from being wasted by the rotting effect of the condensed vapors. Any warm air which may enter the cooling-chamber from outside through the doors when opened for the introduction or removal of the meat or other substance to or from the cooling-chambers is also removed immediately by the fans without coming in contact with the ice. After the meat or other substance placed in the preserving-chamber has been cooled to the temperature of the latter the motion of the fans F F' may be stopped, and they need not be set again in motion, except from time to time, as may be necessary to prevent the temperature in the preserving-chambers from rising above the desired point.

The ascending flues G, having air-inlet openings $e'$ near the ceiling of the ice-chamber, are very useful in withdrawing the vapor from the ice-chamber, especially when packing the ice in damp or foggy weather.

The application of my improvement to an ice-house does entirely away with the condensation of any moisture on the walls, ceilings, and timbers of the preserving-chambers, and thereby keeps the latter perfectly dry, prevents the destructive effects of this condensation both upon the structure and the animal or vegetable substances contained therein, and effects a large saving of ice.

I am aware that fans and other devices have been employed in various ways for creating a circulation of air through the ice-chamber and preserving chamber or chambers, and I do not broadly claim such an arrangement of parts; but

What I claim as my invention is—

In an ice-house, the combination, with the ice-chamber A and one or more preserving-chambers, B C, arranged below the same, of one or more descending flues, H, conducting the cold air from the ice-chamber to the preserving-chamber, of one or more ascending flues, E, having an air-inlet in the preserving-chamber and no communication with the ice space, and a suction-fan, F, which draws the air from the flue E and discharges the same outside of the building, whereby the vitiated air is withdrawn from the preserving-chamber without coming in contact with the ice, substantially as set forth.

RICHARD BULLYMORE.

Witnesses:
EDWARD WILHELM,
JNO. J. BONNER.